(12) United States Patent
Chiang et al.

(10) Patent No.: US 6,214,073 B1
(45) Date of Patent: Apr. 10, 2001

(54) SMOKE EXHAUSTER HAVING A DETACHABLE FAN CASING

(76) Inventors: Chao Cheng Chiang; Chi Shyong Chiang, both of P.O. Box 63-99, Taichung, 406 (TW)

( * ) Notice: Subject to any disclaimer, the term of this patent is extended or adjusted under 35 U.S.C. 154(b) by 0 days.

(21) Appl. No.: 09/301,828

(22) Filed: Apr. 29, 1999

(51) Int. Cl.$^7$ .................................................. B01D 46/00
(52) U.S. Cl. ........................ 55/385.1; 55/471; 55/472; 55/481; 55/DIG. 18; 55/DIG. 36
(58) Field of Search .................. 55/385.1, 473, 55/484, 471, 472, 481, 385.2, DIG. 18, DIG. 36

(56) References Cited

U.S. PATENT DOCUMENTS

| | | | |
|---|---|---|---|
| 4,790,863 | * 12/1988 | Nobirari et al. | 55/385.1 |
| 5,080,699 | * 1/1992 | Ho et al. | 55/385.1 |
| 5,094,676 | * 3/1992 | Karbacher | 55/385.1 |
| 5,443,625 | * 8/1995 | Schaffhausen | 55/385.1 |

\* cited by examiner

Primary Examiner—David A. Simmons
Assistant Examiner—Minh-Chau T. Pham

(57) ABSTRACT

A smoke exhauster includes a housing having a top panel, and a plate secured to the top panel of the housing by a number of fasteners. One or more fan devices are secured to the plate, and a fan casing is secured to the plate for enclosing the fan devices. The plate and the fan casing may be disengaged from the housing for allowing the fan devices and the fan casing to be easily cleaned. An air passage is formed between the top panel of the housing and the plate. A filter device is disposed in the air passage for filtering the exhausted gas drawn through the air passage.

8 Claims, 5 Drawing Sheets

SMOKE EXHAUSTER HAVING A DETACHABLE FAN CASING

BACKGROUND OF THE INVENTION

1. Field of the Invention

The present invention relates to a smoke exhauster, and more particularly to a smoke exhauster having a fan casing that may be detached from the smoke exhauster for cleaning purposes.

2. Description of the Prior Art

Typical smoke exhausters comprise one or more fan devices secured in a fan casing that is secured in a housing. The fan casing and the fan devices are typically and solidly secured in the housing and may not be disengaged from the housing such that the fan casing and the fan devices may not be easily cleaned when required. A great amount of oil or grease will be accumulated within the fan casing and will not be easily cleaned if the fan casing and the fan devices may not be disengaged from the housing.

The present invention has arisen to mitigate and/or obviate the afore-described disadvantages of the conventional smoke exhausters.

SUMMARY OF THE INVENTION

The primary objective of the present invention is to provide a smoke exhauster having a fan casing that may be detached from the smoke exhauster for cleaning purposes.

In accordance with one aspect of the invention, there is provided a smoke exhauster comprising a housing including a top panel, a plate, a plurality of fasteners detachably securing the plate to the top panel of the housing, at least one fan device secured to the plate, and a fan casing secured to the plate for enclosing the fan device. The plate and the fan casing may be disengaged from the housing for allowing the fan devices and the fan casing to be easily cleaned.

The top panel of the housing includes two sides each having a downward flange dependent downward therefrom and each having a lateral flange extended from the downward flange thereof, the plate includes two side edges engaged with the lateral flange of the top panel of the housing, the fasteners are engaged through the side edges of the plate and the lateral flange of the top panel of the housing for securing the side edges of the plate and the lateral flange of the top panel of the housing together.

The housing includes two side walls each having an upper flange extended inward of the housing and each having a downward flange dependent downward from the upper flange of the side wall and secured to the downward flange of the top panel. The top panel of the housing includes an opening formed therein, the plate includes a conduit extended upward therefrom and engaged through the opening of the top panel.

An air passage is formed between the top panel of the housing and the plate for receiving air, the housing includes an upper front portion having a channel formed therein, the smoke exhauster further includes a filter device engaged in the channel of the housing and engaged in the air passage for filtering purposes. The upper front portion of the housing includes a plurality of apertures formed therein and communicating with the air passage for allowing the air to flow out of the housing. The filter device is an active carbon filter device for filtering the exhausted gas drawn through the air passage.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
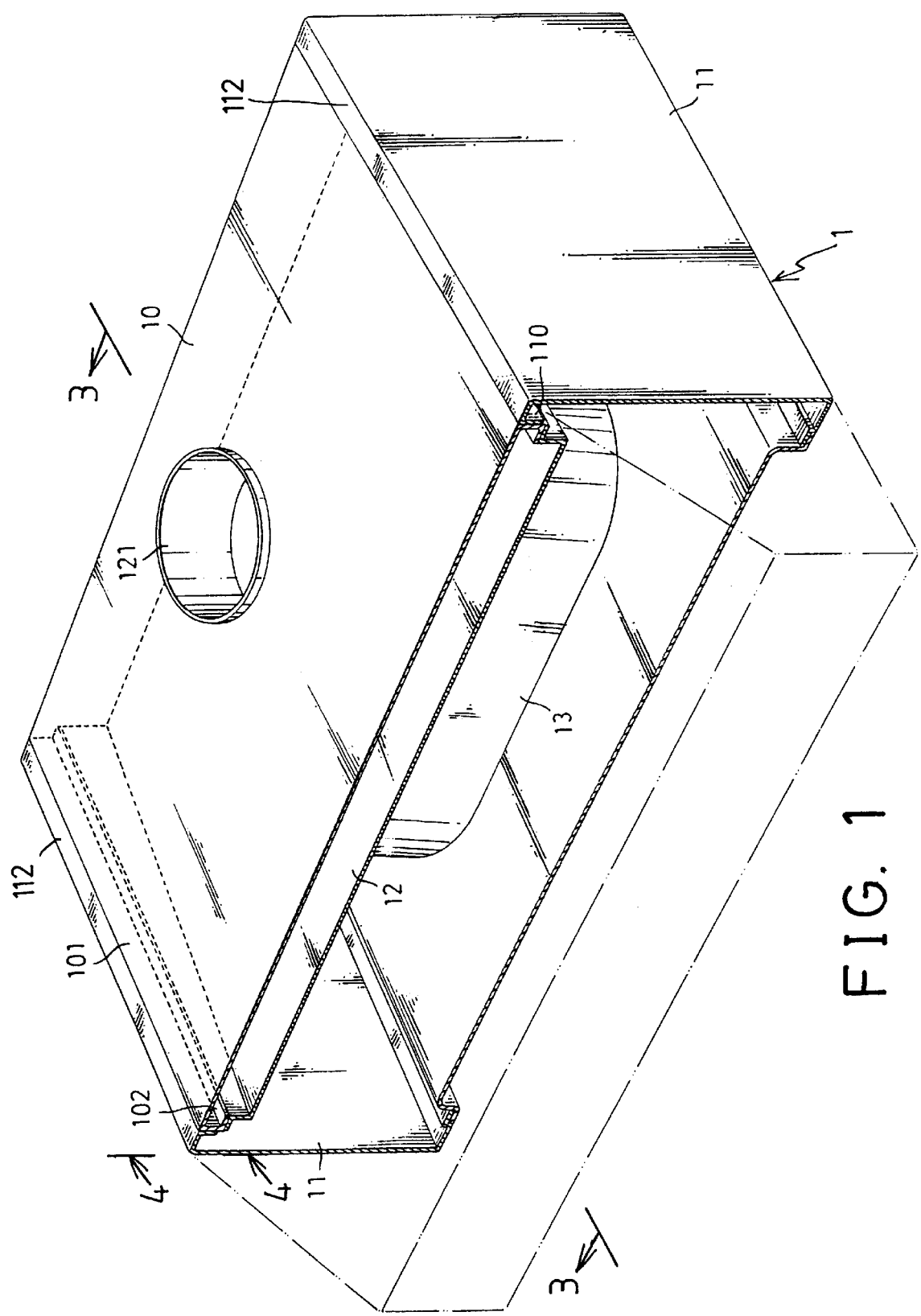
FIG. 1 is a perspective view of a smoke exhauster in accordance with the present invention.
Figure 2:
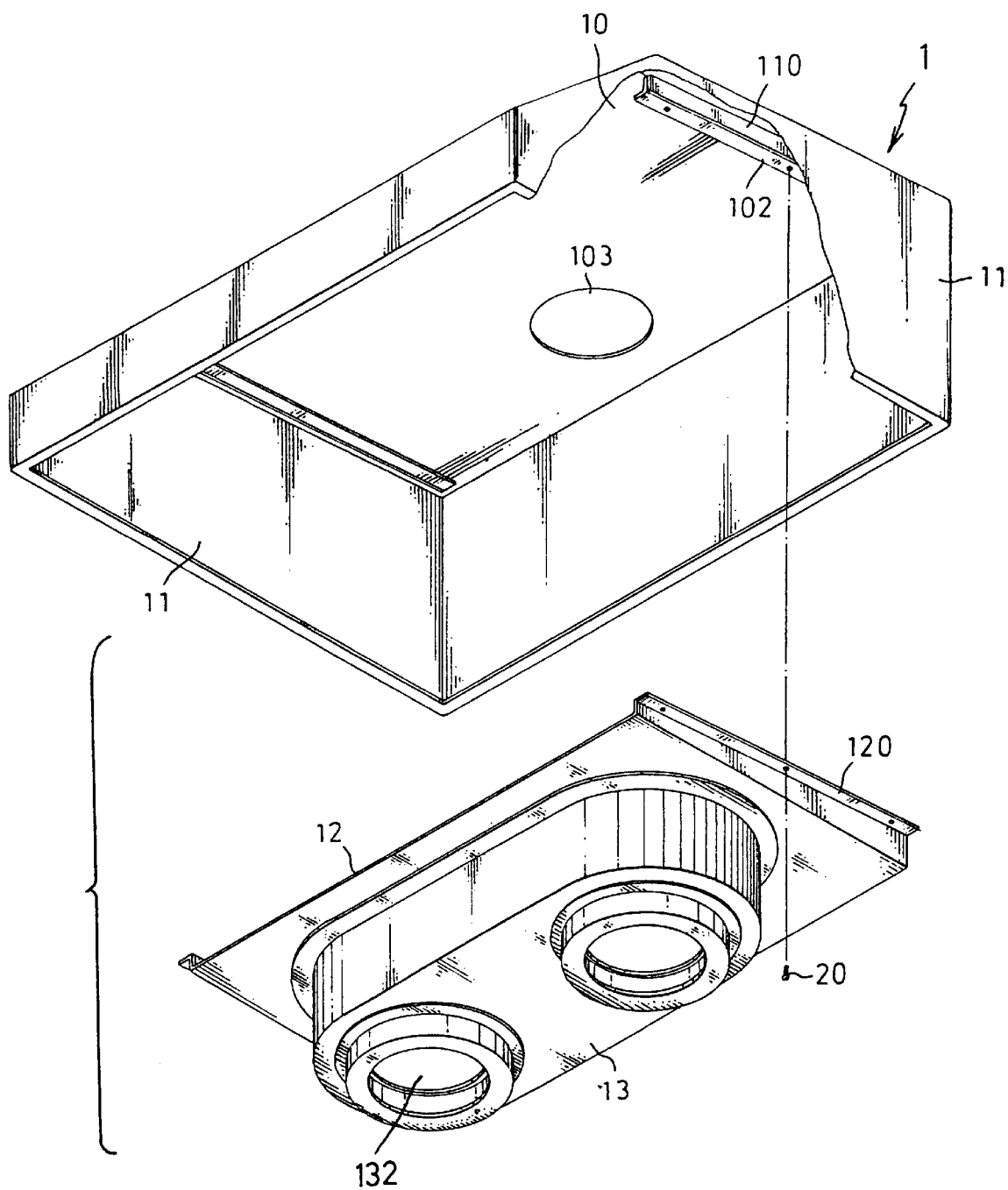
FIG. 2 is an exploded view of the smoke exhauster.
Figure 3:
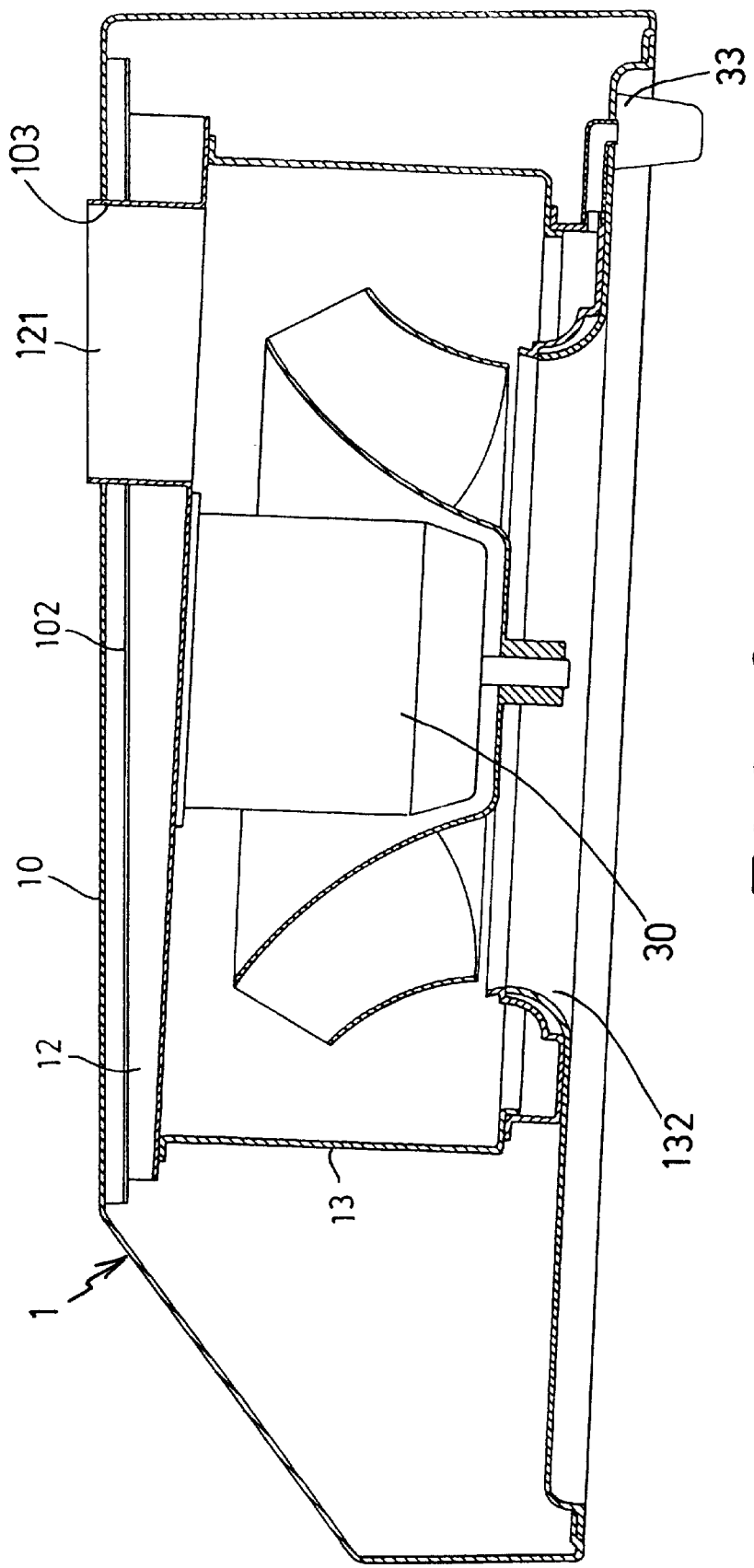
FIG. 3 is a cross sectional view taken along lines 3—3 of FIG. 1.
Figure 4:
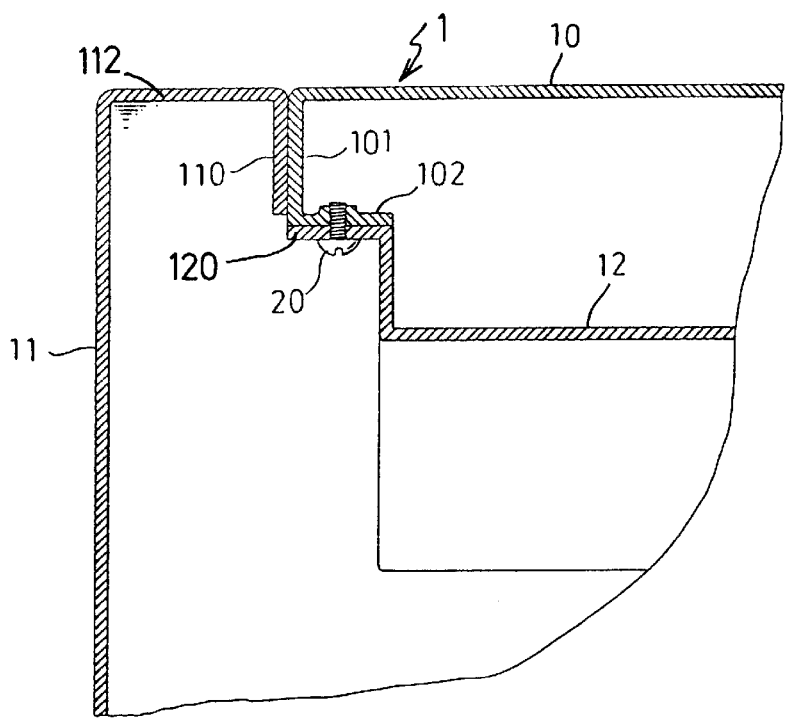
FIG. 4 is an enlarged partial cross sectional view taken along lines 4—4 of FIG. 1.

Referring to the drawings, and initially to FIGS. 1–4, a smoke exhauster in accordance with the present invention comprises a housing 1 including a top panel 10 having an opening 103 formed in the middle portion thereof and having a downward flange 101 extended downward from each of the two sides thereof and having a lateral flange 102 laterally extended from the bottom portion of the downward flange 101. Two side walls 11 each includes a downward flange 110 dependent downward from an upper flange 112 of the side walls 11 and secured to the downward flanges 101 of the top panel 10 by such as the welding processes. The downward flange 110 of the side wall 11 may also be directly secured to the top panel 10 by such as welding processes.

A plate 12 includes two sides each having a side edge 120 provided therein for engaging with the lateral flanges 102 of the top panel 10, and includes a conduit 121 extended upward from the middle portion thereof and engaged through the opening 103 of the top panel 10. A number of fasteners 20 are engaged through the side edges 120 of the plate 12 and the flanges 102 of the top panel 10 for securing the plate 12 to the top panel 10 of the housing 1. One or more fan devices 30 are secured to the bottom of the plate 12. It is preferable that the fan devices 30 are centrifugal type fan devices 30 and it is preferable that two fan devices 30 are secured to the plate 12. A casing 13 is secured to the plate 12 by such as the welding processes for enclosing the fan devices 30 and includes one or more orifices 132 formed in the bottom portion thereof and located below the fan devices 30 respectively for allowing the air to be drawn through the casing 13 by the fan devices 30.

The plate 12 is not horizontal and is slightly inclined relative to a horizontal level for accumulating and for guiding the collected oil toward one or more receptacles 33 that are located in the rear portion of the housing 1. The air and/or the exhaust gas may be drawn through the casing 13 and drawn out through the conduit 121 by the fan devices 30. The plate 12 may be disengaged from the top panel 10 of the housing 1 by releasing the fasteners 20 such that the fan devices 30 and the casing 13 may be more easily cleaned. The typical fan casings are solidly secured to the housing 1 and may not be disengaged from the housing 1 for cleaning the fan devices. The fan casing 13 may probably be disengaged from the housing 1 one time per year. But, the fan casing 13 that may be disengaged from the housing 1 facilitates the cleaning of the fan devices and the fan casing 13.

Figure 5:
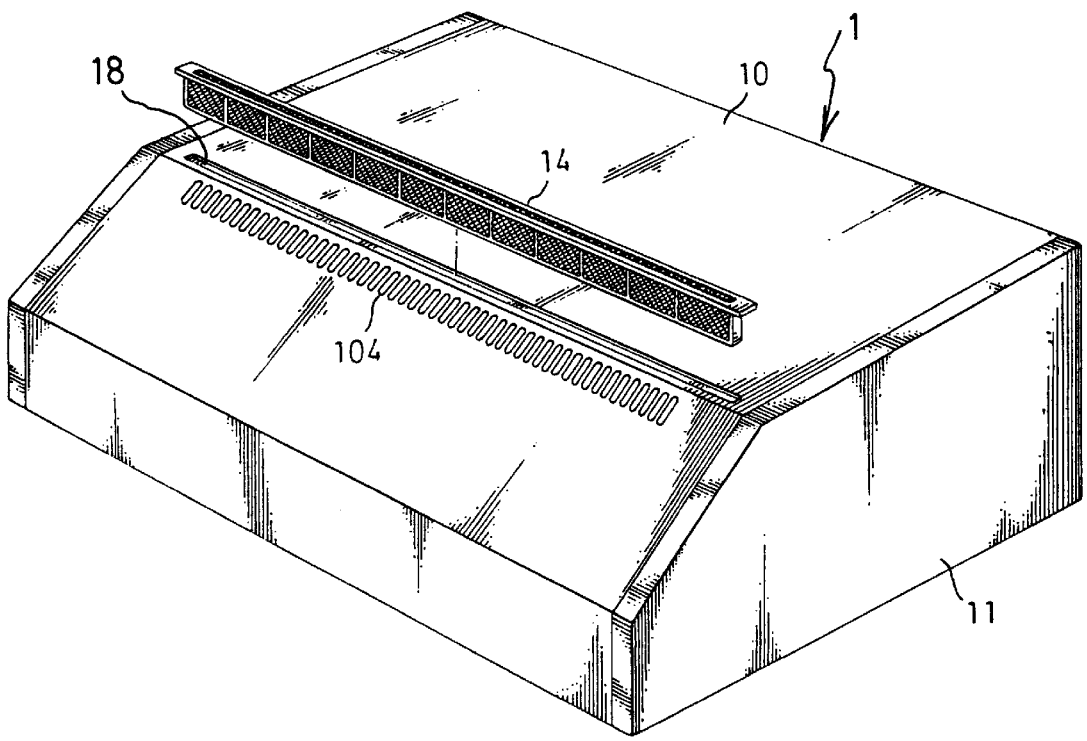
FIG. 5 is a partial exploded view illustrating the other application of the smoke exhauster.
Figure 6:
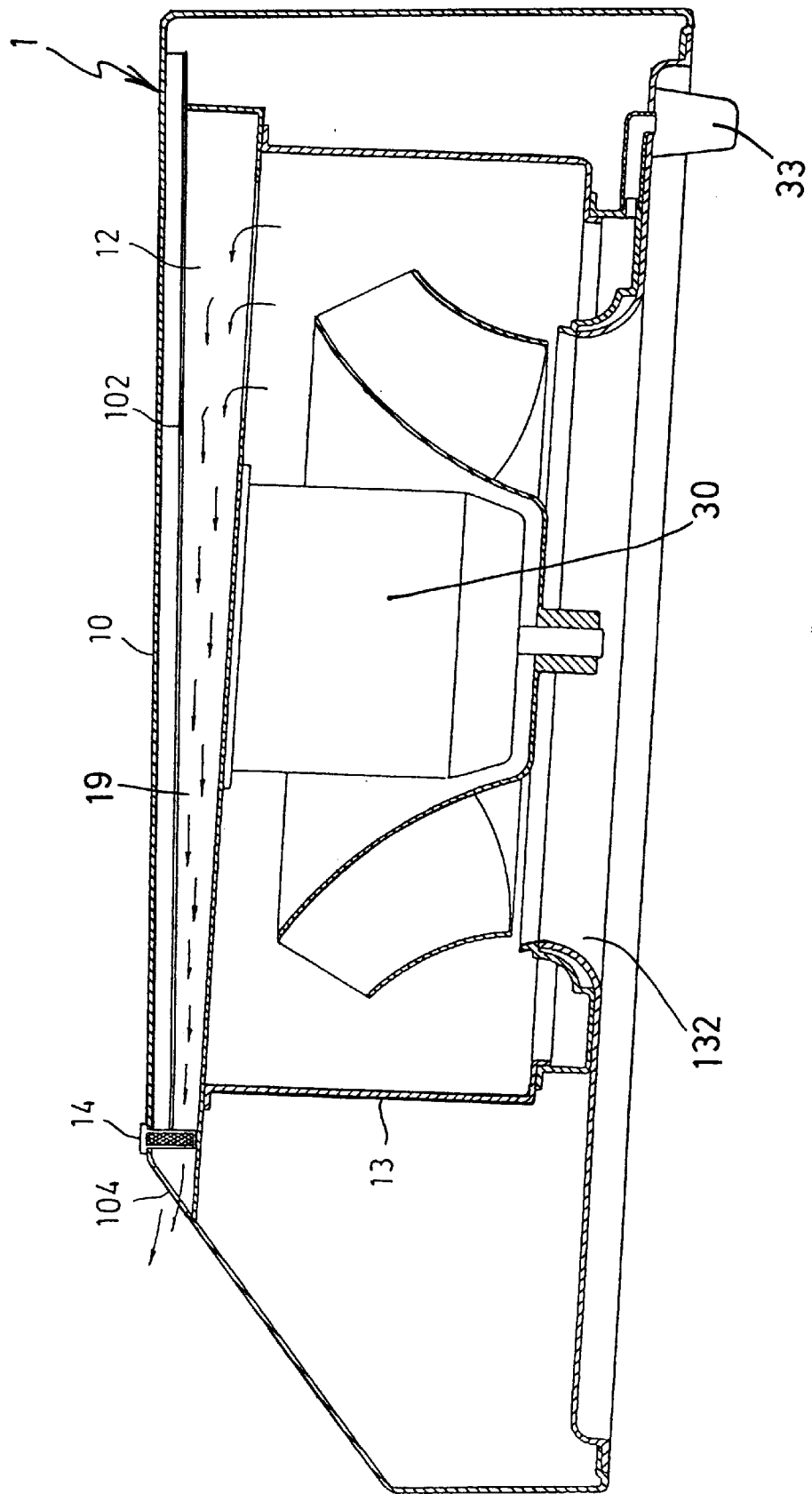
FIG. 6 is a cross sectional view of the smoke exhauster as shown in FIG. 5.

Referring next to FIGS. 5 and 6, an air passage 19 is formed between the plate 12 and the top panel 10 of the housing 1. The housing 1 includes a channel 18 formed in the upper and front portion thereof for receiving a filter device 14, such as an active carbon filter device. The filter device 14 is engaged into the air passage 19 for filtering the exhaust gas drawn into the air passage 19 by the fan devices 30. The housing 1 includes a number of apertures 104 formed in the upper and front portion thereof and communicating with the air passage 19 for allowing the filtered air to flow out of the housing 1. The air passage 19 and the filter device 14 may be provided in addition to the conduit 121 of the plate 12 and the opening 103 of the top panel 10 of the housing 1. The conduit 121 may also be removed when the air passage 19 is provided in the housing 1.

Accordingly, the smoke exhauster in accordance with the present invention includes a fan casing that may be detached from the smoke exhauster for cleaning purposes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

What is claimed is:

1. A smoke exhauster comprising:

a housing including a top panel having an opening formed therein, said housing including a front portion;

a plate detachably secured in said housing and disposed below said top panel for forming and defining an air passage between said top panel of said housing and said plate for receiving air, said air passage being communicating with said front portion of said housing for allowing the air to flow out through sail front portion of said housing;

a filter device engaged in said air passage for filtering the air flowing out through said front portion of said housing; and at least one fan device secured to said plate for drawing and forcing an air to flow into said housing and to flow out through said opening of said top panel of said housing and to flow out through said air passage defined between said top panel of said housing and said plate.

2. The smoke exhauster according to claim 1, wherein said housing includes a channel formed in said front portion thereof for receiving said filter device.

3. The smoke exhauster according to claim 1, wherein said front portion of said housing includes a plurality of apertures formed therein and communicating with said air passage for allowing the air to flow out of said front portion of said housing.

4. The smoke exhauster according to claim 1, wherein said filter device is an active carbon filter device.

5. The smoke exhauster according to claim 1, wherein said plate includes a conduit extended upward therefrom and engaged through said opening of said top panel.

6. The smoke exhauster according to claim 1 further comprising a fan casing secured to said plate for enclosing said at least one fan device.

7. The smoke exhauster according to claim 1, wherein said top panel of said housing includes two sides each having a downward flange dependent downward therefrom and each having a lateral flange extended from said downward flange thereof, said plate includes two side edges engaged with said lateral flange of said top panel of said housing, a plurality of fasteners detachably secure said plate to said top panel of said housing and are engaged through said side edges of said plate and said lateral flange of said top panel of said housing for securing said side edges of said plate and said lateral flange of said top panel of said housing together.

8. The smoke exhauster according to claim 1, wherein said housing includes two side walls each having an upper flange extended inward of said housing and each having a downward flange dependent downward from said upper flange of said side wall and secured to said downward flange of said top panel.

* * * * *